United States Patent [19]

Egami

[11] Patent Number: 4,700,342
[45] Date of Patent: Oct. 13, 1987

[54] REMOTE REPEATER IN TRANSMISSION BUS SYSTEM

[75] Inventor: Noritaka Egami, Nagasaki, Japan

[73] Assignee: Mitsubishi Denki Kabushiki Kaisha, Tokyo, Japan

[21] Appl. No.: 829,223

[22] Filed: Feb. 14, 1986

[30] Foreign Application Priority Data

Feb. 15, 1985 [JP] Japan .................................. 60-26492

[51] Int. Cl.$^4$ ........................... H04J 3/02; H04B 3/36
[52] U.S. Cl. ........................................ 370/85; 370/97
[58] Field of Search ................... 370/85, 97, 13.1, 88; 179/170 R; 340/825.01, 825.05; 379/4, 342

[56] References Cited

U.S. PATENT DOCUMENTS 3,739,098  6/1973  Camiciottoli et al. ................ 370/97
4,099,024  7/1978  Boggs et al. .......................... 370/85

OTHER PUBLICATIONS

"The Ethernet: A Local Area Network, Data Link Layer and Physical Layer Specification", Version 1.0, Sep. 30, 1980.

Primary Examiner—Douglas W. Olms
Assistant Examiner—Frank M. Scutch, III
Attorney, Agent, or Firm—Bernard, Rothwell & Brown

[57] ABSTRACT

A remote repeater for facilitating the signal transmission between a plurality of segments constituting a transmission bus system includes a main receiver for receiving a signal on the transmission bus of the segment to which this repeater belongs, a main driver for sending out a signal onto the transmission bus, an output port for sending out the signal to a remote repeater which belongs to another segment, and an input port for receiving a signal from another remote repeater. The signal received from the transmission bus is sent out through the output port to another remote repeater, while the signal coming in from another remote repeater is sent out over the transmission bus and, at the same time, sent out through the output port to another remote repeater.

10 Claims, 8 Drawing Figures

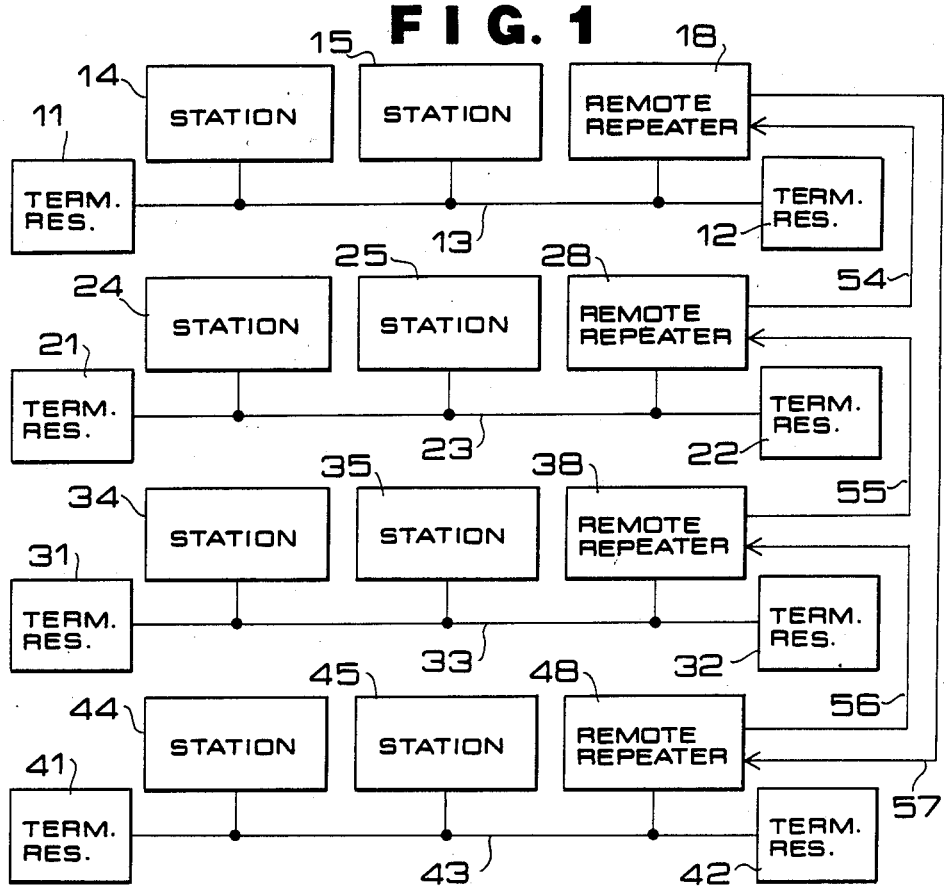
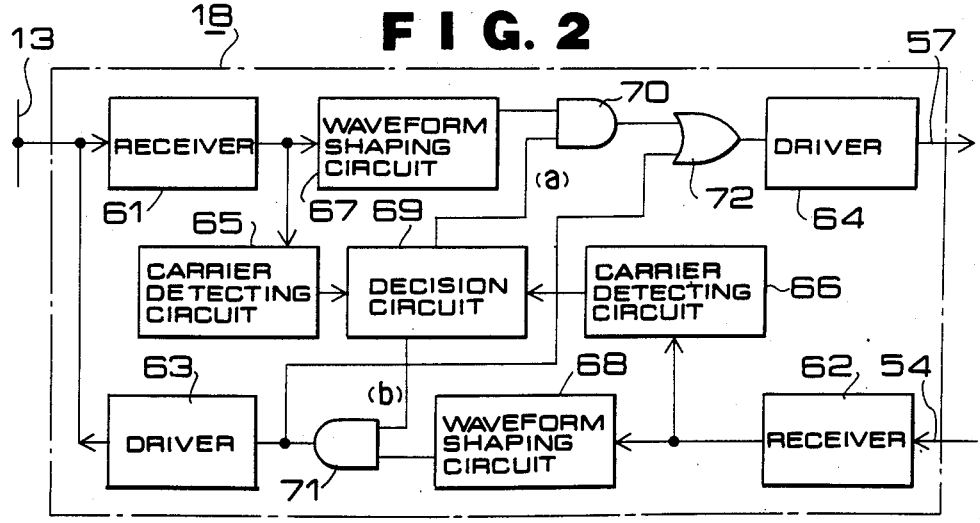

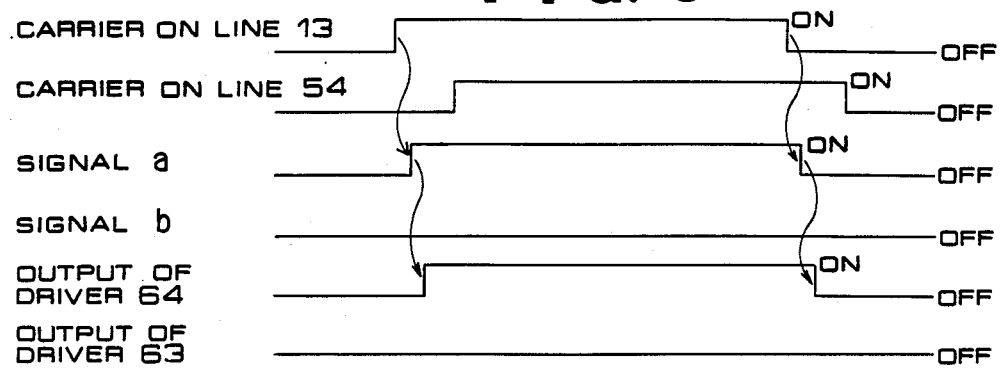
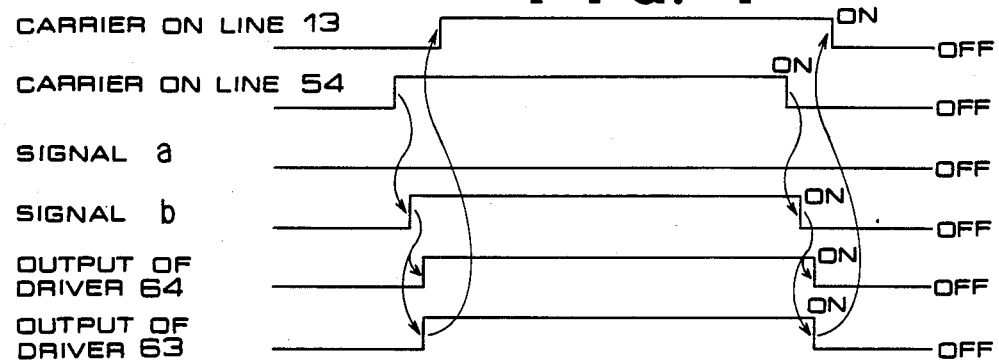
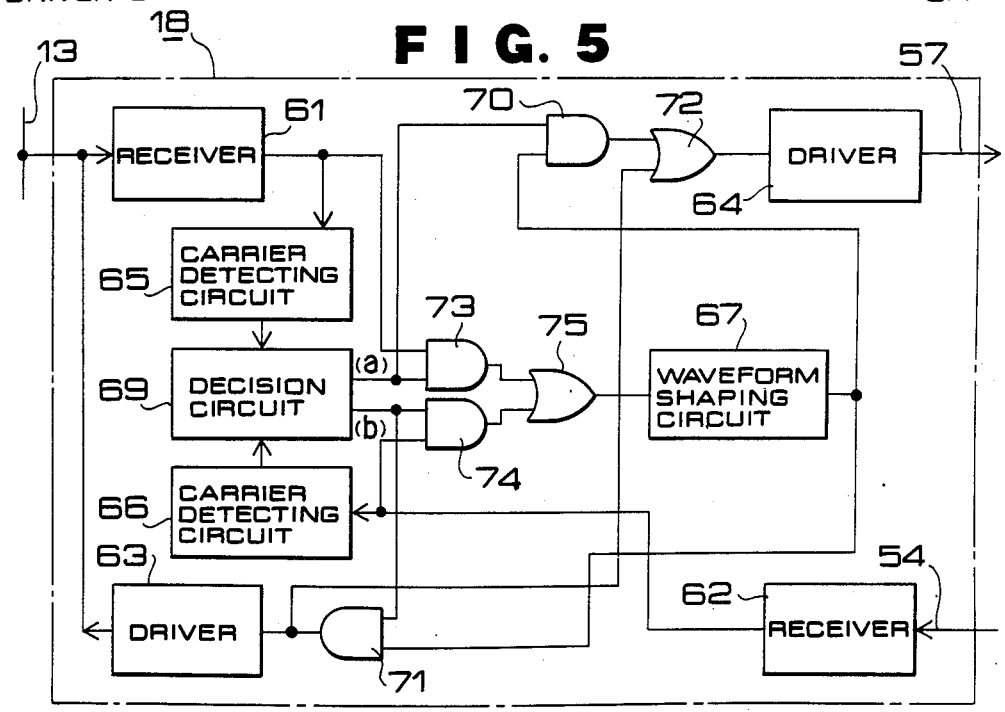

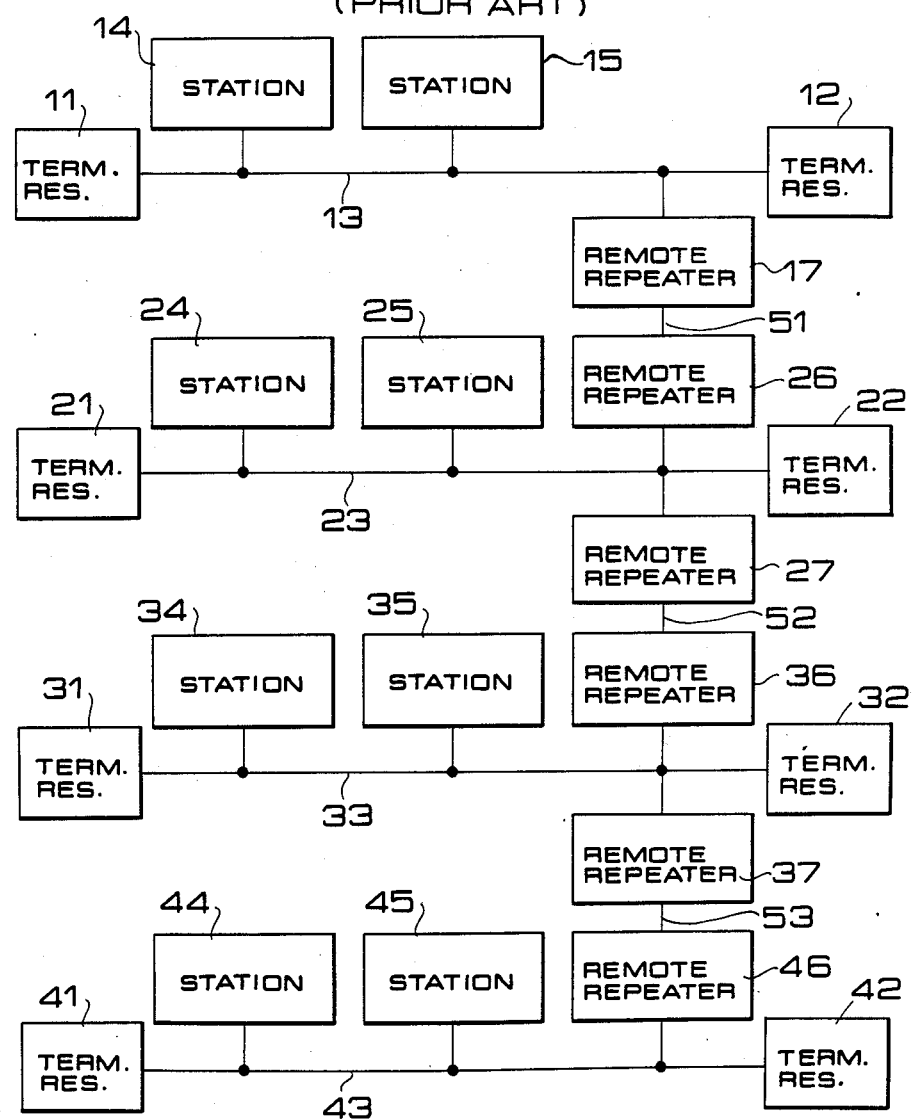

REMOTE REPEATER IN TRANSMISSION BUS SYSTEM

BACKGROUND OF THE INVENTION

1. Field of the Invention

The present invention relates to a transmission bus system including a plurality of stations linked to the transmission bus in the form of multidrop, and particularly to a remote repeater installed for the purpose of extending the distance of a segment of the transmission bus.

2. Description of the Prior Art

A conventional remote repeater used in a multidrop transmission bus system is disclosed in a publication entitled, "The Ethernet: A Local Area Network, Data Link Layer and Physical Layer Specifications", Version 1.0, Sept. 30, 1980. In FIG. 6 is shown a transmission system in which the conventional remote repeaters are used, including a plurality of segments (four segments in this case) 13, 23, 33 and 43 each consisting of a twisted pair cable or coaxial cable. Each segment has a connection of two stations 14 and 15 (24 and 25; 34 and 35; 44 and 45) capable of transmission and reception over the transmission bus. Provided at both ends of segments 13, 23, 33 and 43 are terminating resistors 11 and 12; 21 and 22; 31 and 32; 41 and 42, respectively, for matching the transmission line impedance. Two adjacent segments 13 and 23 are linked by a signal line 51 on which remote repeaters 17 and 26 are installed. Similarly, the segments 23 and 33 are linked via a signal line 52 with remote repeaters 27 and 36 on the signal line 52, and the segments 33 and 43 are linked via a signal line 53 with remote repeaters 37 and 46 on the signal line 53. The remote repeaters 17, 26, 27, 36, 37 and 46 are substantially the same in their structure, and the following description for the remote repeater 17 is also applied to the remaining ones. The arrangement of the remote repeater 17 shown in FIG. 7 includes receivers 61 and 62 for receiving signals on the segment 13 and signal line 51, respectively, drivers 63 and 64 for outputting signals onto the segment 13 and signal line 51, respectively, carrier detecting circuits 65 and 66 for detecting carriers on the lines 13 and 51, respectively, a decision circuit 69 for testing the order of carrier detections, AND gates 70 and 71, and waveform shaping circuits 67 and 68 for shaping the signals at the output of the receivers 61 and 62, respectively. The receiver 61 (62) and driver 63 (64) in combination constitute a bidirectional driver/receiver.

Next, the operation of the remote repeater will be described on the assumption that the station 14 transmits a signal. In the repeater 17, the receiver 61 receives the signal on the segment 13 and the carrier detecting circuit 65 detects the carrier in the signal. The decision circuit 69 responds to the reception of the carrier from the segment 13 to enable the AND gate 70. Then, the signal received by the receiver 61 is shaped by the waveform shaping circuit 67 and is fed through the AND gate 70, which sends out it through the driver 64 over the signal line 51. The other repeater 26 receives the signal on the signal line 51 and outputs the shaped signal to the segment 23, and other stations 24 and 25 can receive the signal transmitted by the station 14. The remaining repeaters 27, 36, 37 and 46 operate in the same manner and all of the remaining stations can receive the signal from the station 14.

A problem is that the signal provided by the driver 64 of the remote repeater 17 is directly received by the receiver 62, causing the carrier detecting circuit 66 to respond to it. However, the decision circuit 69 operates to detect which of the carrier detecting circuits 65 and 66 has provided an active output in producing its output, and therefore the signal line 13 is not disturbed by the operation of the driver 63. In this case, as shown in the timing chart of FIG. 8, the AND gate 70 is enabled, while the AND gate 71 is disabled. When the station 14 has ceased transmission, the carrier detecting circuit 65 ceases the active output, causing the AND gate 70 to be disabled, preparatory to the subsequent carrier detection.

Next, in case that the station 24 transmits the signal, the stations 14, 15, 34, 35, 44 and 45 can receive the signal transmitted from the station 24 through the remote repeaters 17, 26, 27, 36, 37 and 46. The following describes specifically the operation of the remote repeater 17. As opposed to the previous operation, the receiver 62 receives the signal on the signal line 51, the carrier in the signal is detected by the carrier detecting circuit 66, which provides the output to the decision circuit 69. The circuit 69 enables the AND gate 71 so that the signal shaped by the waveform shaping circuit 68 is outputted through the driver 63 over the signal line 13, and the stations 14 and 15 can receive it.

The conventional remote repeater arranged as described above needs the use of remote repeaters in pairs, and therefore the construction cost becomes extremely high when the system includes many segments. For example, a transmission system having four segments, as in the construction of FIG. 6, necessitates six remote repeaters, and if the number of segments increases to eight, the number of remote repeaters increases to 14.

SUMMARY OF THE INVENTION

It is an object of the present invention to provide a remote repeater whose operation is same as that of the conventional remote repeater, in the same number of segments included in the transmission system.

According to this invention, each segment needs only one remote repeater. Such a drastic reduction in the necessary number of remote repeaters is achieved by linking the remote repeaters provided for the segments in a ring.

According to one aspect of this invention, a remote repeater connected to the transmission bus of each segment for transacting signals among a plurality of segments constituting a multidrop transmission bus system comprises: a first receiver adapted to receive a signal on a transmission bus; a first carrier detecting circuit adapted to receive a carrier in the signal at the output of the receiver; a second receiver adapted to receive a signal from another remote repeater connected to a transmission bus of another segment; a second carrier detecting circuit adapted to detect a carrier in the signal at the output of the second receiver; a decision circuit adapted to test which of the first and second carrier detecting circuits has detected the carrier earlier and produce a first signal upon early detection of the carrier by the first carrier detecting circuit or produce a second signal upon early detection of the carrier by the second carrier detecting circuit; a first signal sending means adapted to send the output signal of the first receiver to a second receiver of still another remote repeater with the same structure connected to still another segment during a period when the first signal sending means is receiving the first signal produced by the decision circuit; and a second signal sending means adapted to send the output signal from the second receiver onto the transmission bus and, at the same time, to the second receiver of the still another repeater connected to the still another segment during a period when the second signal sending means is receiving the second signal produced by the decision circuit.

Thus, each segment is provided with a single remote repeater having a signal sending means or an output port and a signal reception means or an input port, the output port of each remote repeater being connected to the adjacent downstream remote repeater in order and the output port of the most downstream remote repeater being connected to the input port of the most upstream remote repeater, thereby forming a loop signal path. In consequence, each remote repeater can transmit the signal to any other remote repeater or repeaters over the loop signal path.

BRIEF DESCRIPTION OF THE DRAWINGS

FIG. 1 is a block diagram showing a transmission bus system incorporating remote repeaters embodying this invention;

FIG. 2 is a block diagram showing a remote repeater embodying the present invention;

FIG. 3 is a timing chart showing an operational sequence of a remote repeater shown in FIG. 1;

FIG. 4 is a timing chart showing another operational sequence of a remote repeater shown in FIG. 1;

FIG. 5 is a block diagram showing another embodiment of the present invention;

FIG. 6 is a block diagram showing a transmission bus system incorporating conventional remote repeaters;

DETAILED DESCRIPTION OF THE PREFERRED EMBODIMENTS

Figure 8:
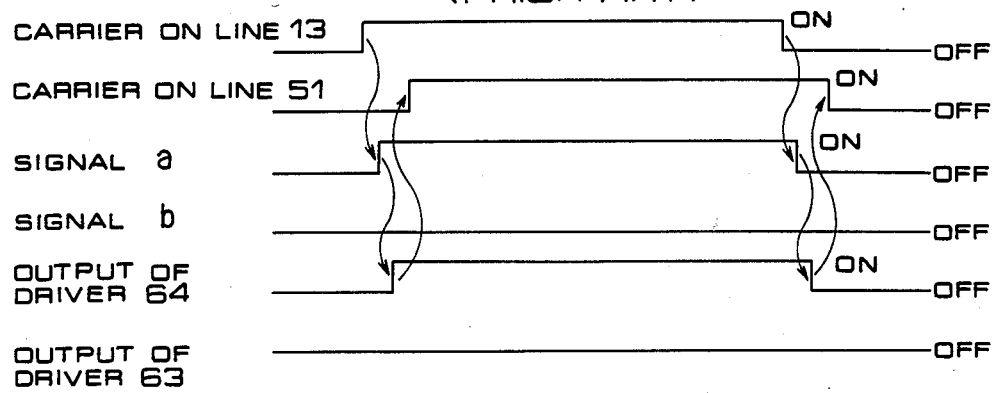
FIG. 8 is a timing chart showing an operational sequence of the remote repeater shown in FIG. 7.

Referring now to FIG. 1 showing a multidrop transmission bus system incorporating the inventive remote repeaters, the bus system may include a desired number of, four in this example, transmission bus segments 13, 23, 33 and 43. The segment 13 has connections of terminating resistors 11 and 12, stations 14 and 15, and a remote repeater 18. The remaining segments 23, 33 and 43 have the same arrangement including respective terminating resistors 21, 22, 31, 32, 41 and 42, respective stations 24, 25, 34, 35, 44 and 45, and respective remote repeaters 28, 38 and 48. Each remote repeater has an independent input port and output port, as will be described in detail hereinafter.

In the arrangement of FIG. 1, the remote repeater 18 has its output port connected via a signal line 57 to the input port of the remote repeater 48 which has its output port connected through a signal line 56 to the input port of the remote repeater 38. The output port of the remote repeater 38 is connected via a signal line 55 to the input port of the remote repeater 28, the output port of which is connected via a signal line 54 to the input port of the remote repeater 18, whereby the four remote repeaters are in a ring connection.

Figure 7:
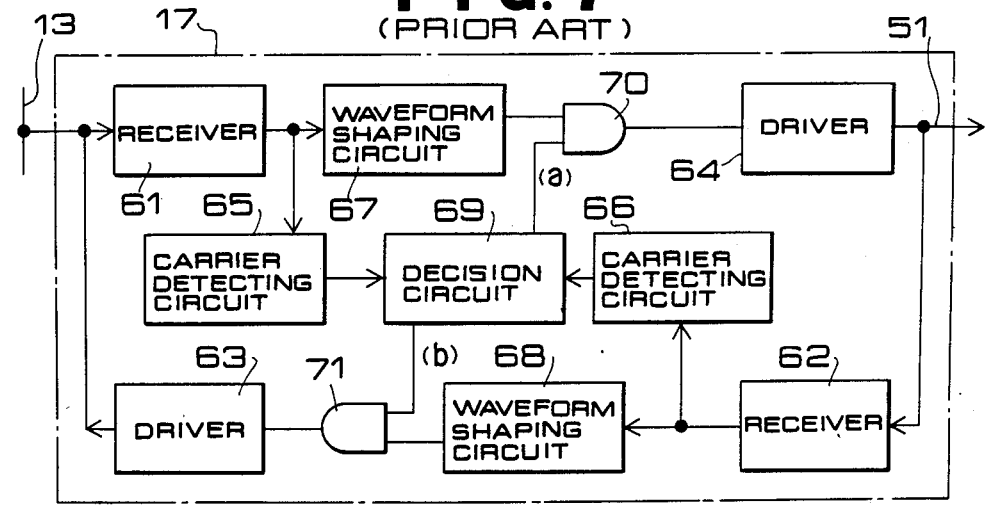
FIG. 7 is a block diagram showing a conventional remote repeater.

The remote repeater 18, as shown in FIG. 2, includes a receiver 61 for receiving a signal on the transmission bus 13, a waveform shaping circuit 67 for shaping the output signal of the receiver, and a carrier detecting circuit 65 for detecting the carrier in the output signal of the receiver 61. Further included in the repeater 18 are another receiver 62 connected to the signal line 54, a waveform shaping circuit 68 for shaping the output signal of the receiver 62, and a carrier detecting circuit 66 for detecting the carrier in the output signal of the receiver 62. A decision circuit 69 provided in the repeater 18 operates, in the same way as the conventional remote repeater shown in FIG. 7, to produce a signal for enabling either an AND gate 70 or 71 upon detection of the carrier by the carrier detecting circuit 65 or 66. When the AND gate 70 is enabled, the output signal from the waveform shaping circuit 67 is fed through the AND gate 70 and an OR gate 72 to the driver 64, and the output of the driver is sent over the signal line 57. When, on the other hand, the AND gate 71 is enabled, the output signal from the waveform shaping circuit 68 is fed through the AND gate 71 and driver 63 onto the transmission bus segment and, at the same time, the output of the AND gate 71 is also fed through the OR gate 72 and driver 64 onto the signal line 57. The output terminal of the driver 64 corresponds to the output terminal of driver 64 shown in FIG. 7, and the input terminal of the receiver 62 corresponds to the input terminal of receiver 62 shown in FIG. 7. The remaining remote repeaters 28, 38 and 48 all have the same arrangement as the repeater 18 shown in FIG. 2.

Next, the operation of the remote repeater 18 will be described. Assuming that the station 14 transmits a signal, in the remote repeater 18, the receiver 61 receives the signal on the signal line 13 and the carrier detecting circuit 65 detects the carrier in the signal. Then, an active output from the circuit 65 causes the decision circuit 69 to enable the AND gate 70 in correspondence to the carrier detection on the signal line 13. The signal received at the receiver 61 is shaped in the waveform shaping circuit 67 and fed through the AND gate 70 and then to the driver 64 onto the signal line 57 as a signal to be sent to the repeater 48. This operation, with its timing relationship shown in FIG. 3, is identical to the case of the conventional remote repeater.

Next, the operation of the remote repeater 18 for receiving a signal on the signal line 54 and outputting the signal to the drivers 63 and 64 will be described. The receiver 62 receives the signal on the signal line 54 and the carrier detecting circuit 66 provides an active signal in response to the detection of the carrier in the signal, causing the decision circuit 69 to enable the AND gate 71 in correspondence to the carrier detection on the signal line 54. The signal received by the receiver 62 is shaped in the waveform shaping circuit 68 and fed through the AND gate 71 and driver 63. The output signal of the driver is sent to the stations 14 and 15. The operation is same as in the conventional case, with the exception that the output signal of the AND gate 71 is also fed through the OR gate 72 to the driver 64, resulting in the transmission of the signal on the signal line 54 to both of the segment 13 and 57 through the drivers 63 and signal line 64 respectively, after having been shaped. The timing relationship in this operation is shown in FIG. 4.

In this way, the transmitted signal from the station 14 is propagated to the remote repeaters in the order of 18, 48, 38 and 28, and in another case the transmitted signal from the station 34 is propagated to the remote repeaters in the order of 38, 28, 18 and 48, and finally back to themselves.

FIG. 5 shows a modification of the remote repeater of this invention. In this embodiment, the remote repeater is provided with gate means including AND gates 73 and 74 and an OR gate 75 which operate in accordance with the output signal a or b from the decision circuit 69. This arrangement differs from FIG. 2 in that, in response to the operation of the gate means, the signal from the receiver 61 or 62 is fed to the waveform shaping circuit 67 which provides the output signal to be supplied to both of the AND gates 70 and 71. Of the two output signals provided by the receivers 61 and 62, only a signal selected by the gate means is fed to the single waveform shaping circuit 67, whereby the circuit construction can be simplified.

Although in the foregoing embodiments the signal paths linking the remote repeaters are generally composed of electric signal cables, optical cables may be used with drivers and receivers having optical-electric transducing means.

What is claimed is:

1. A remote repeater system used in a multidrop-type transmission bus system for connecting segments of said bus system, comprising:
   a first receiver for receiving a signal on one of said segments, said first receiver producing an output signal;
   a first carrier detecting circuit for detecting a carrier in the output signal of said first receiver;
   a second receiver for receiving a signal from a remote repeater connected to another segment, said second receiver producing an output signal;
   a second carrier detecting circuit for detecting a carrier in the output signal of said second receiver;
   a decision circuit for testing which of said first and second carrier detecting circuits has detected the carrier earlier and to produce a first signal in response to earlier detection by said first carrier detecting circuit and a second signal in response to earlier carrier detection by said second carrier detecting circuit;
   a first signal sending means for sending the output signal of said first receiver to the second receiver of a further remote repeater connected to a further segment during a period when said first signal sending means is receiving said first signal from said decision circuit and
   a second signal sending means for sending the output signal of said second receiver onto said one of said segments and, at the same time, to the second receiver of said further remote repeater connected to said further segment while receiving said second signal from said decision circuit.

2. A remote repeater system according to claim 1, wherein said first signal sending means comprises an AND gate having a first input terminal to which the output signal from said first receiver is supplied and a second input terminal for receiving said first signal from said decision circuit, and an OR gate having a first input terminal connected to an output of said AND gate and a second input terminal connected to an output of said second signal sending means.

3. A remote repeater system according to claim 2, wherein said first signal sending means further comprises a driver having an input terminal connected to the output terminal of said OR gate and an output terminal connected to said further remote repeater.

4. A remote repeater system according to claim 3, wherein said second signal sending means comprises an AND gate having a first input terminal to which the output signal from said second receiver is supplied and a second input terminal for receiving said second signal from said decision circuit, with an output terminal of said AND gate being connected to said transmission bus and the second input terminal of said OR gate.

5. A remote repeater system according to claim 4 which further comprises a circuit for shaping the waveform of the output signal from said first receiver.

6. A remote repeater system according to claim 4 which further comprises a circuit for shaping the waveform of the output signal from said second receiver.

7. A remote repeater system used in a multidrop-type transmission bus system for connecting segments of said bus system;
   a first receiver for receiving a signal on one of said transmission bus segments, said first receiver producing an output signal;
   a first carrier detecting circuit for detecting a carrier in the output signal of said first receiver;
   a second receiver for receiving a signal from a remote repeater connected to another segment, said second receiver producing an output signal;
   a second carrier detecting circuit for detecting a carrier in the output signal of said second receiver;
   a decision circuit for testing which of said first and second carrier detecting circuits has detected the carrier earlier and to produce a first signal in response to earlier carrier detection by said first carrier detecting circuit and a second signal in response to earlier carrier detection by said second carrier detecting circuit;
   a gate means for selecting the output signal of said first receiver while receiving said first signal from said decision circuit and the output signal of said second receiver while receiving said second signal from said decision circuit;
   a circuit for shaping the waveform of the signal selected by said gate means;
   a first signal sending means for sending an output signal of said waveform shaping circuit to the second receiver of a further remote repeater connected to a further segment during a period when said first signal sending means is receiving said first signal from said decision circuit; and
   a second signal sending means for sending the output signal of said waveform shaping circuit onto said one of said segments and, at the same time, to the second receiver of said further remote repeater connected to said further segment while receiving said second signal from said decision circuit.

8. A remote repeater system according to claim 7, wherein said first signal sending means comprises an AND gate having a first input terminal to which the output signal from said first receiver is supplied and a second input terminal for receiving said first signal from said decision circuit, and an OR gate having a first input terminal connected to an output of said AND gate and a second input terminal connected to the output of said second receiver.

9. A remote repeater system according to claim 8, wherein said first signal sending means further comprises a driver having an input terminal connected to the output terminal of said OR gate and an output terminal connected to said another remote repeater.

10. A remote repeater system according to claim 9, wherein said second signal sending means comprises an AND gate having a first input terminal to which the output signal from said second receiver is supplied and a second input terminal for receiving said second signal from said decision circuit, with an output terminal of said AND gate being connected to said one of said segments and the second input of said OR gate.

* * * * *

UNITED STATES PATENT AND TRADEMARK OFFICE
CERTIFICATE OF CORRECTION

PATENT NO. : 4,700,342

DATED : October 13, 1987

INVENTOR(S) : Noritaka Egami

It is certified that error appears in the above-identified patent and that said Letters Patent is hereby corrected as shown below:

Column 4, line 19, after "segment" insert the numeral --13--;

Signed and Sealed this

Thirty-first Day of May, 1988

Attest:

DONALD J. QUIGG

*Attesting Officer*

*Commissioner of Patents and Trademarks*

UNITED STATES PATENT AND TRADEMARK OFFICE
CERTIFICATE OF CORRECTION

PATENT NO. : 4,700,342

DATED : October 13, 1987

INVENTOR(S) : Noritaka Egami

It is certified that error appears in the above-identified patent and that said Letters Patent is hereby corrected as shown below:

Column 4, line 59, after "and" insert the words --signal line--;

line 60, after "and" delete the words "signal line".

Signed and Sealed this

Sixteenth Day of August, 1988

Attest:

DONALD J. QUIGG

Attesting Officer

Commissioner of Patents and Trademarks